United States Patent
Wang et al.

(10) Patent No.: US 7,058,469 B2
(45) Date of Patent: Jun. 6, 2006

(54) SYSTEM AND METHOD FOR FULLY AUTOMATIC MANUFACTURING CONTROL IN A FURNACE AREA OF A SEMICONDUCTOR FOUNDRY

(75) Inventors: Ming Wang, Zhonghe (TW); Tsean Chou, Taichung (TW); Larry Jann, Taipei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 21 days.

(21) Appl. No.: 10/876,359

(22) Filed: Jun. 24, 2004

(65) Prior Publication Data

US 2005/0288814 A1    Dec. 29, 2005

(51) Int. Cl.
*G06F 19/00* (2006.01)

(52) U.S. Cl. .................. 700/121; 700/100; 700/110; 156/345.24

(58) Field of Classification Search ............ 700/99, 700/100, 108, 110, 111, 117, 121; 156/345.24
See application file for complete search history.

(56) References Cited

U.S. PATENT DOCUMENTS

| 4,938,655 A | 7/1990 | Asano |
| 5,475,618 A | 12/1995 | Le |
| 5,591,299 A | 1/1997 | Seaton et al. |
| 6,522,939 B1 | 2/2003 | Strauch et al. |
| 2004/0040654 A1* | 3/2004 | Masuda .................. 156/308.6 |
| 2005/0187647 A1* | 8/2005 | Wang et al. ................ 700/100 |

OTHER PUBLICATIONS

IBM: IBM SiView Standard, 1 page, http://www-6.ibm.com/jp/iisc/English/po/siview.
IBM: What's IBM SiView Standard, 3 pages, http://www-6.ibm.com/jp/iisc/English/po/siview/about.html.
IBM: Characteristic of IBM SiView Standard, 1 page, http://www-6.ibm.com/jp/iisc/English/po/siview/merit.html.

* cited by examiner

*Primary Examiner*—Leo Picard
*Assistant Examiner*—Douglas S. Lee
(74) *Attorney, Agent, or Firm*—Haynes and Boone, LLP

(57) ABSTRACT

A computer-implemented method and system for automating control of a furnace area within a semiconductor fabrication facility are provided. In one example, the method includes processing a current batch using process equipment, removing the current batch from the process equipment, and loading a next batch into the process equipment. The current batch may then be tested to determine if the current batch was properly processed. If the current batch fails the testing, the next batch may be removed from the process equipment and corrections may be made to the process equipment before reloading the next batch. If the current batch passes the testing, the next batch may be set as the new current batch and the new current batch may be processed.

20 Claims, 4 Drawing Sheets

SYSTEM AND METHOD FOR FULLY AUTOMATIC MANUFACTURING CONTROL IN A FURNACE AREA OF A SEMICONDUCTOR FOUNDRY

FIELD OF TECHNOLOGY

The present disclosure relates generally to the field of semiconductor manufacturing and, more particularly, to a system and method for automating a furnace area in a semiconductor foundry.

BACKGROUND

Semiconductor manufacturing is a relatively complex process that may utilize hundreds of steps to produce a semiconductor device or a batch of such devices. Each step may include masking, photolithography, etching, rinsing, etc., each of which may be a single process or which may involve multiple processes. The time needed to produce such devices may involve several months. Due in part to the number of steps and the amount of time used to produce a semiconductor device, a step taking several hours on a single piece of equipment may be relatively expensive due to the amount of time that the equipment is unavailable for other products.

Accordingly, what is needed is a system and method thereof that optimizes the use of semiconductor fabrication equipment.

DETAILED DESCRIPTION

Figure 1:
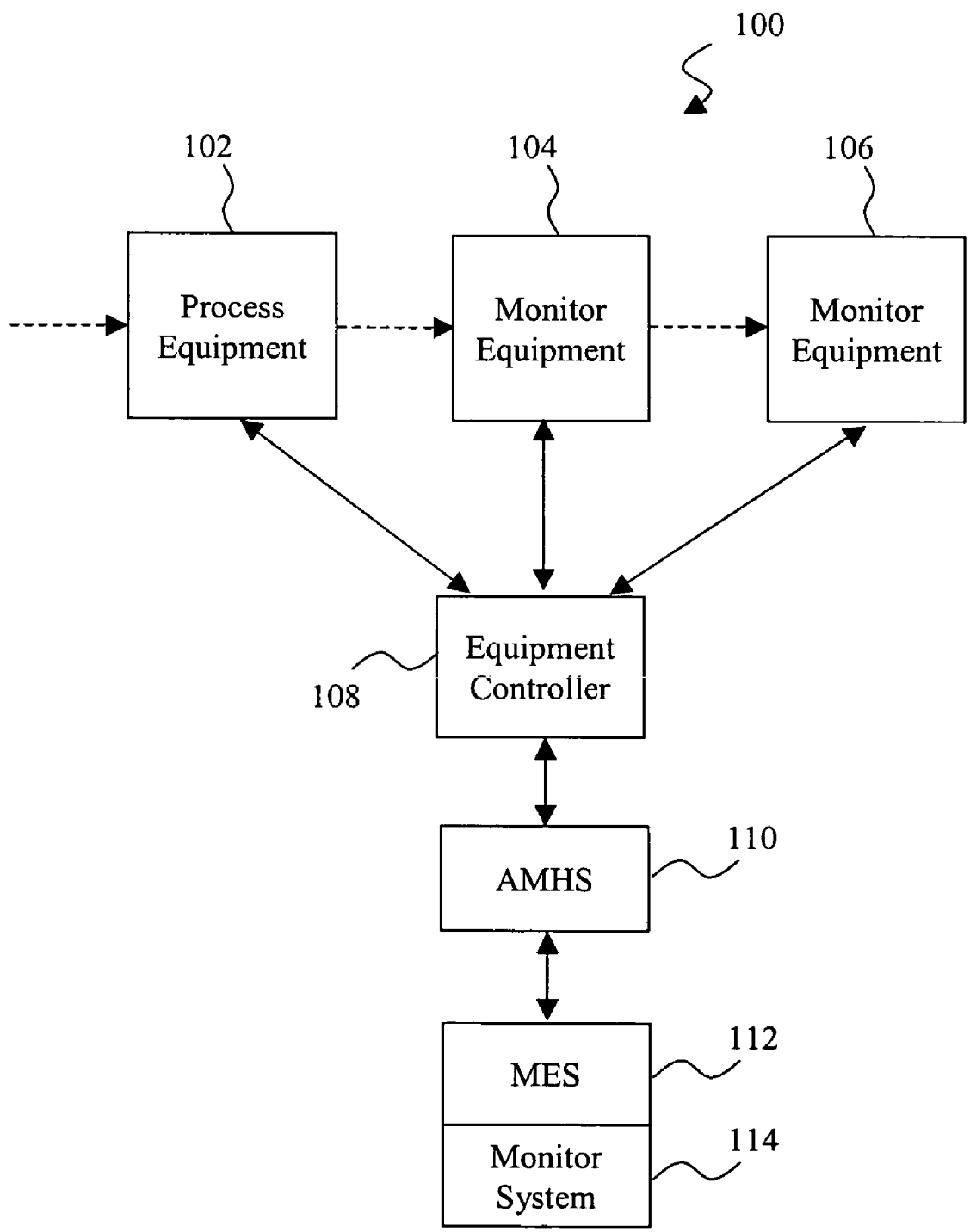
FIG. 1 illustrates a schematic view of one embodiment of a system for automating control within a furnace area of a semiconductor fabrication facility.

The present disclosure relates generally to the field of semiconductor manufacturing and, more particularly, to a system and method for automating a furnace area in a semiconductor foundry. It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a system 100 enables a batch of semiconductor devices to be processed and tested, with the results of the testing being used to determine whether to process a following batch. The system 100 includes process equipment 102, monitor (e.g., testing) equipment 104, 106, an equipment controller 108 that is configured to control the process equipment 102, an advanced material handling system (AMHS) 110, and a manufacturing execution system 112, which includes a monitor system 114. It is understood that the system 100 is for purposes of example only, and that components may be removed, replaced, reconfigured, and/or additional components may be added. For example, the monitor system 114 may be integrated with other components illustrated in FIG. 1, or may be implemented as a standalone system.

In the present example, the process equipment 102 includes a furnace that may be used to perform processing on one or more semiconductor devices. The monitor equipment 104, 106 may test a batch for particle impurities or other flaws resulting from improper operation of the process equipment 102. It is noted that, although the term "batch" is used for purposes of illustration, the present disclosure may be applied to single wafers, lots, batches, devices, or any other single component or group of components (all of which are included hereinafter under "batch") upon which may be performed at least one semiconductor processing step. The monitor equipment 104, 106 may be configured to store test information locally, rather than relying on external devices or systems (e.g., the MES 112) to store such information. As will be described later, this enables the equipment controller 108 to retrieve the test information directly from the monitor equipment 104, 106, rather than from the MES 112. It is understood that the monitor equipment 104, 106 may be associated with one or more databases (not shown) that may store the test information.

The equipment controller 108 may communicate with the process equipment 102 and the monitor equipment 104, 106. The equipment controller 108 may also communicate with the MES/monitor system 112, 114 via the AMHS 110. The AMHS 110 may be configured to automate the movement of batches between pieces of equipment, as well as perform other tasks.

The MES 112 may be an integrated computer system representing methods and tools used to accomplish production of a semiconductor device through the manufacturing entities. For example, the MES 112 may collect data in real time, organize and store the data in a centralized database, and perform operations related to work order management, workstation management, process management, inventory tracking, and document control. It is understood that the MES may incorporate different technologies, such as PROMIS (Brooks Automation Inc. of Massachusetts), WORKSTREAM (Applied Materials, Inc. of California), POSEIDON (IBM Corporation of New York), MIRL-MES (Mechanical Industry Research Laboratories of Taiwan), and/or a Petri net. The monitor portion of the MES 112 may include computer-executable instructions for receiving test information from the equipment controller and using that information to determine whether the process equipment 102 is operating properly.

Figure 2:
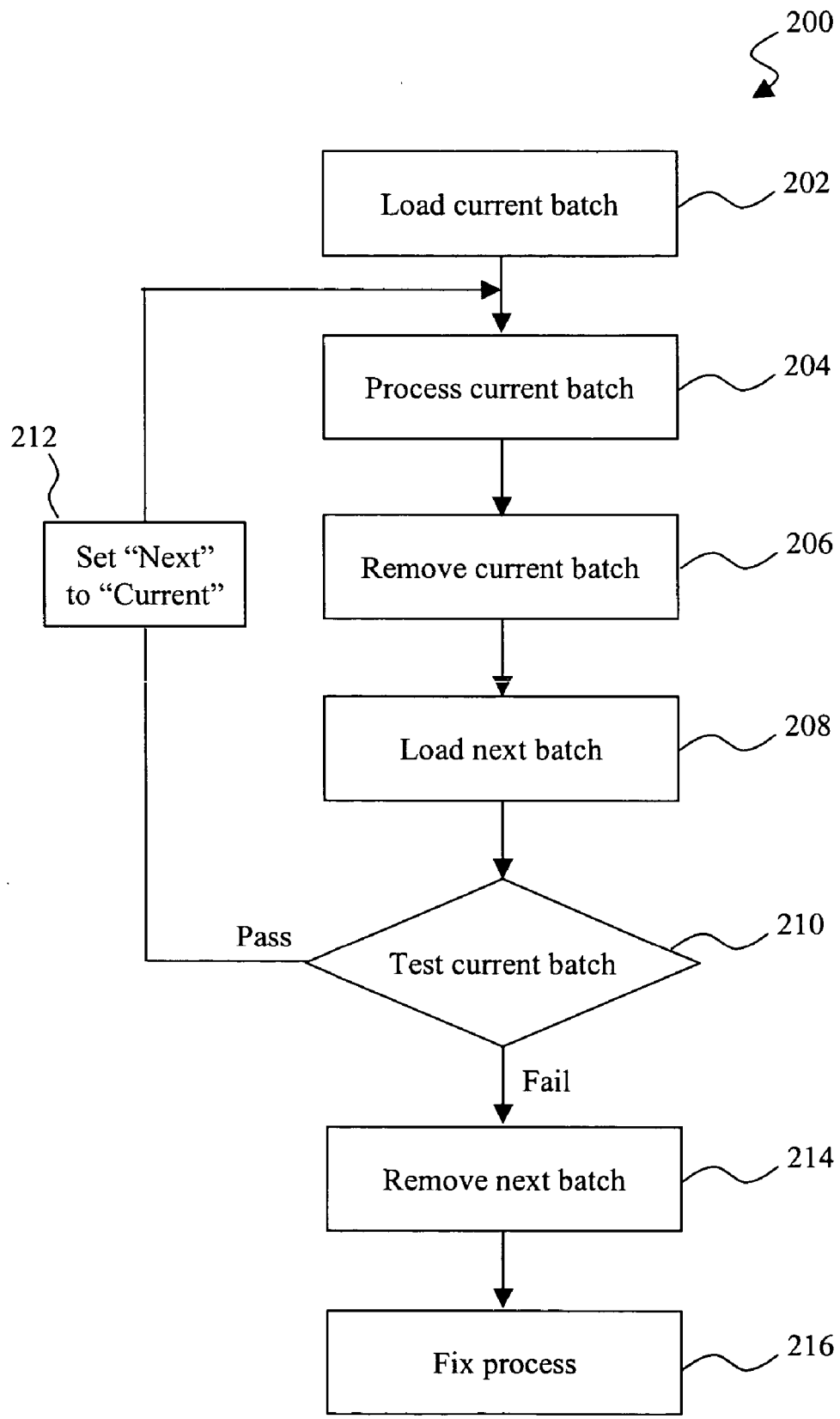
FIG. 2 is a flow chart of a first exemplary method for optimizing processing within the system of FIG. 1.

With additional reference to FIG. 2, a method 200 illustrates one embodiment of an operation that may be performed within the system 100 of FIG. 1. In the present example, because the processing time of a batch within the process equipment 102 (e.g., the furnace) may be several hours, an efficient use of the furnace is desired. Accordingly, the method 200 maximizes the use of the processing equipment 102 while automatically verifying that the processing equipment is operating with its designated parameters. Furthermore, the method 200 may automatically begin processing a later batch when the preceding batch is determined to have been correctly processed.

In step 202, a "current" batch is loaded into the processing equipment 102. In step 204, the current batch is processed, which may include multiple steps and may take up to several hours. While the processing in the present example is in reference to a furnace, it is understood that the method 200 may also be applied to other processes. In step 206, the current batch is removed after processing, and the next batch is loaded into the processing equipment in step 208. It is noted that, when the next batch is loaded, the system 100 may not know whether the process equipment 102 has correctly processed the current batch.

In step 210, the current batch is tested by the monitor equipment 104 and the monitor equipment 106. If results of the tests from both the monitor equipment 104 and the monitor equipment 106 indicate that the current batch was properly processed (e.g., the current batch passes the tests), then the method 200 continues to step 212, where the next batch (loaded in step 208) is set as the current batch. The method then returns to step 204 and processes the new current batch.

However, if the results of the tests from one or both of the monitor equipment 104 and the monitor equipment 106 indicate that the current batch was not properly processed (e.g., the current batch fails one or both of the tests), then the method 200 continues to step 214, where the next batch is removed from the process equipment 102. It is understood that, in some embodiments, corrections may be made to the process equipment without unloading the next batch. In step 216, an engineer or other technician may adjust or repair the process equipment 102 based on the test results. For example, if the test results indicate that the current batch is contaminated with particles, then the process equipment 102 may be cleaned to prevent contamination of the next batch.

Accordingly, each batch is processed based on the test results of the preceding batch. If the preceding batch is successfully tested (e.g., if it passes the tests), then the next batch is automatically processed. In the present example, human intervention is only needed if a batch fails one or both tests, indicating that the process equipment 102 needs attention. It is understood that, in some embodiments, automated cleaning and/or other automated procedures may be implemented in step 216 to minimize or avoid the need for human interaction. For example, an automated cleaning process may be triggered based on the test results.

Figure 3:
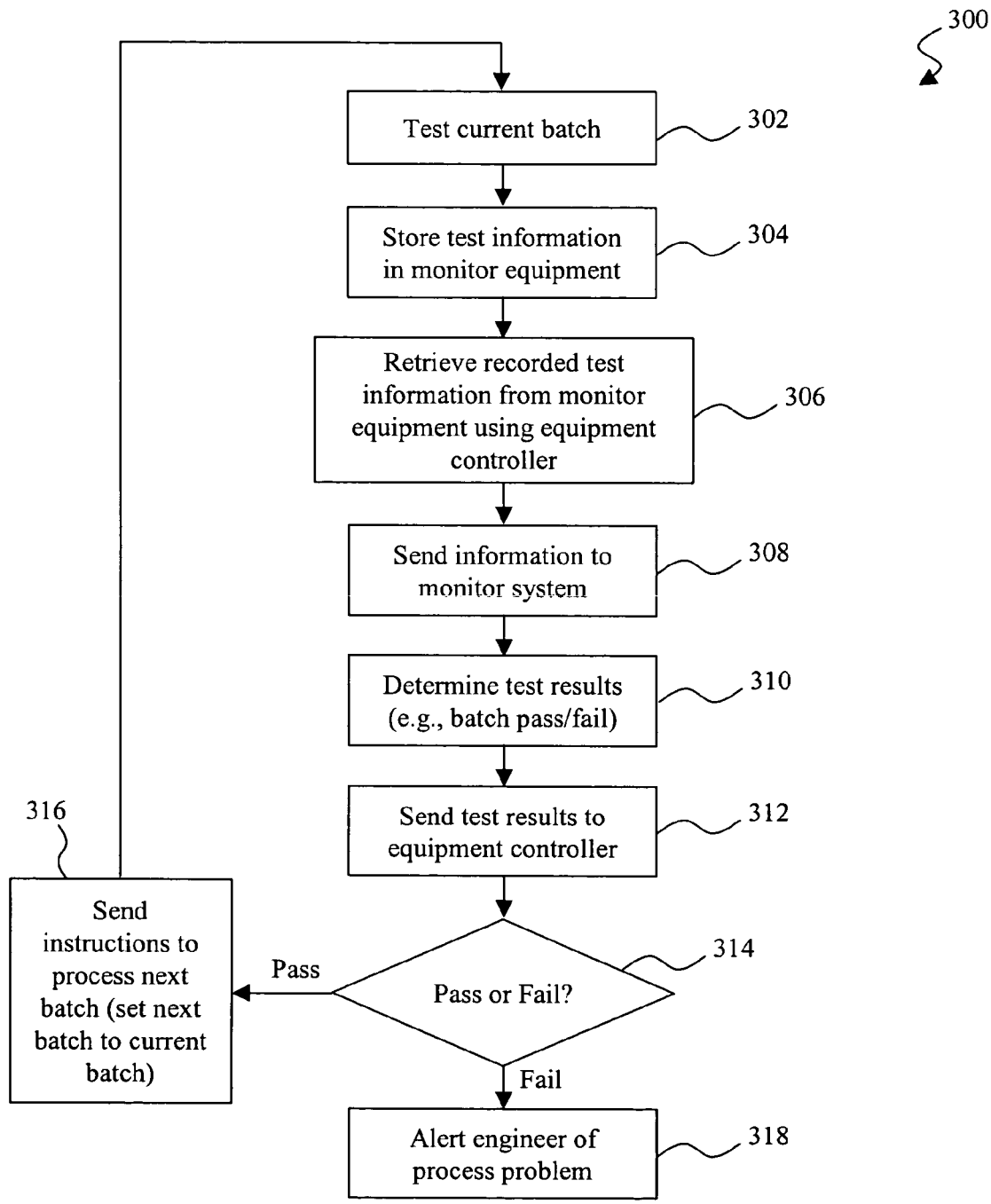
FIG. 3 is a flow chart of a second exemplary method for optimizing processing within the system of FIG. 1.

Referring now to FIG. 3, a method 300 illustrates one embodiment of a flow of information through the system 100 of FIG. 1. It is understood the method 300 is for purposes of illustration only, and that alterations for the method 300 (or other methods entirely) may be needed depending on the configuration of the system 100. For example, if the monitor system 114 is implemented in FIG. 1 as a standalone system, then changes may be needed to adapt the method 300 to this system configuration.

In step 302, a current batch may be tested by the monitor equipment 104, 106 (FIG. 1). In some embodiments, if the current batch fails testing by either the monitor equipment 104 or 106, the current batch may be failed without testing by the other monitor equipment. In step 304, the test information obtained during step 302 may be stored within the monitor equipment that conducted the test or in a database accessible to the monitor equipment. It is understood that the test information may be stored alternatively or additionally in the MES 112 and/or in other components of the system 100. However, the local storage of the present example enables the equipment controller 108 to directly track each batch and the related test results.

In step 306, the equipment controller 108 may retrieve the recorded test information from the monitor equipment 104 and/or 106, and send the information to the monitor system 114 within the MES 112 in step 308. In step 310, the monitor system 114 may use the test information to determine whether the current batch passed or failed the tests (e.g., whether the process equipment 102 properly processed the current batch). In step 312, the test results may be sent to the equipment controller 108.

In step 314, the equipment controller 108 may determine whether the current batch failed or passed the tests. If the current batch successfully passed both tests (by the monitor equipment 104, 106), the method 300 moves to step 316, where the equipment controller 108 sends instructions to the process equipment 102 to begin processing the next batch. It is understood that the equipment controller 108 may control a batch status (e.g., hold, process, etc.) in the MES based on the test results. As described with respect to FIG. 2, the next batch may have been loaded into the process equipment 102 prior to or during the testing of the current batch. If the current batch failed to pass either test, the method 300 moves to step 318, where a notification may be sent to a predefined destination (e.g., an engineer, a software system designed to monitor the equipment, etc.) to indicate that the process equipment 102 has a process problem. For example, an engineer may be notified via email that a process problem related to the process equipment 102 has occurred and, in some embodiments, the email or other notification may provide the engineer with information regarding the problem, as well as potential causes of the problem and/or solutions to the problem. As previously described, maintenance may then be performed on the process equipment 102. Also as previously described, in some embodiments, an engineer or other technician may not be notified if an automated system is available for running diagnostics on and/or fixing the process equipment 102, although a log file may be used to track such automated actions.

It is understood that, in some embodiments, the monitor system 114 may send a signal indicating pass/fail to the equipment controller 108, rather than returning actual test results. In other embodiments, the monitor system 114 may pass the results to the MES 112, which may then instruct the equipment controller 108 to begin processing. In still other embodiments, the equipment controller 108 may evaluate the test information, rather than the monitor system 114.

Figure 4:
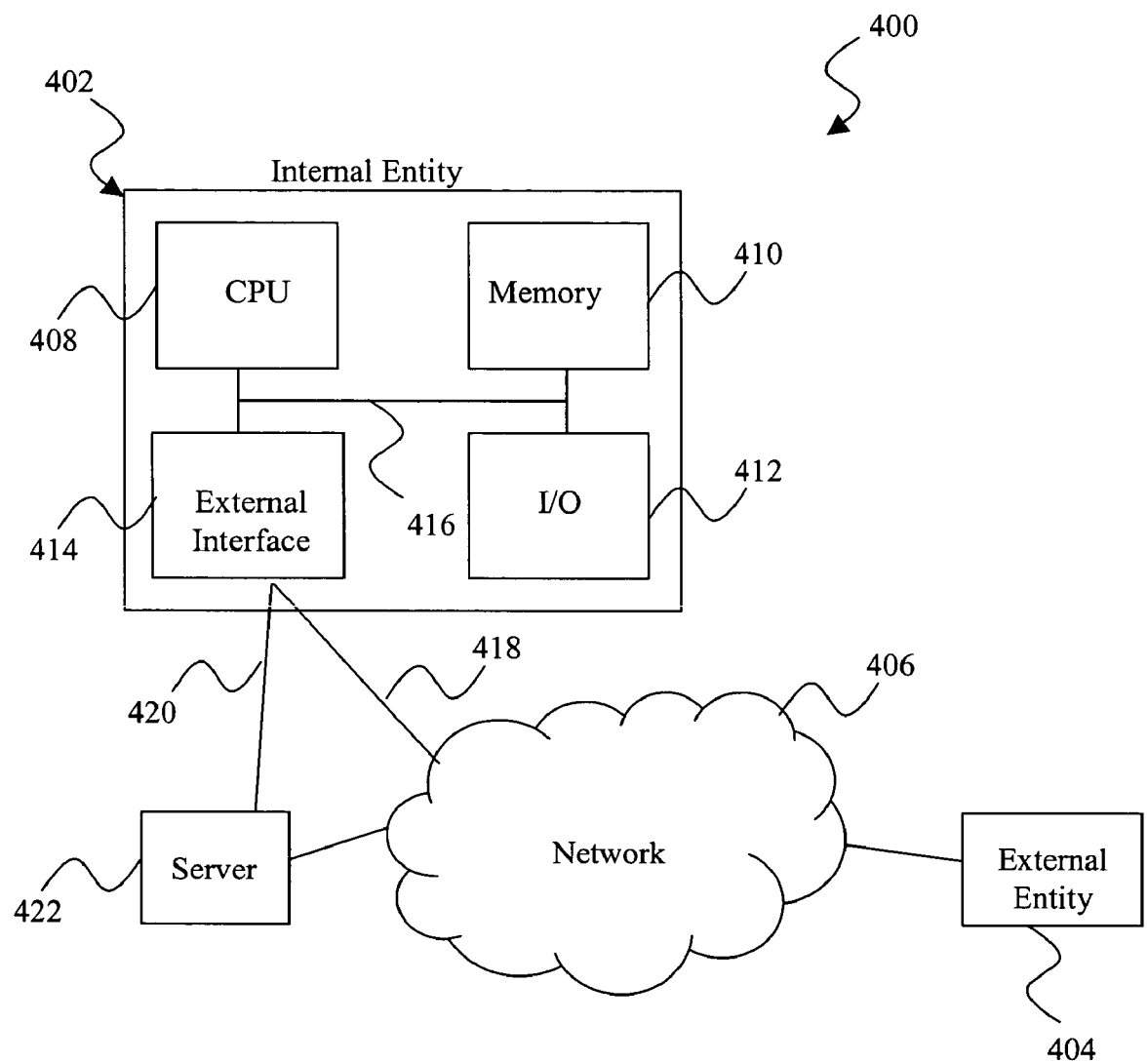
FIG. 4 illustrates a schematic view of a virtual fabrication facility (virtual fab) within which the system of FIG. 1 and/or the methods of FIGS. 2 and 3 may be implemented.

Referring now to FIG. 4, a virtual IC fabrication system (a "virtual fab") 400 provides an exemplary environment within which the system 100 of FIG. 1 may be implemented. For example, various components of the system 100 may be included in or represented by the entities of the virtual fab 400. The virtual fab 400 includes a plurality of entities represented by one or more internal entities 402 and one or more external entities 404 that are connected by a communications network 406. The network 406 may be a single network or may be a variety of different networks, such as an intranet and the Internet, and may include both wireline and wireless communication channels.

Each of the entities 402, 404 may include one or more computing devices such as personal computers, personal digital assistants, pagers, cellular telephones, and the like. For the sake of example, the internal entity 402 is expanded to show a central processing unit (CPU) 408, a memory unit 410, an input/output (I/O) device 412, and an external interface 414. The external interface may be, for example, a modem, a wireless transceiver, and/or one or more network interface cards (NICs). The components 408–414 are interconnected by a bus system 416. It is understood that the internal entity 402 may be differently configured and that each of the listed components may actually represent several different components. For example, the CPU 408 may actually represent a multi-processor or a distributed processing system; the memory unit 224 may include different levels of cache memory, main memory, hard disks, and remote storage locations; and the I/O device 412 may include monitors, keyboards, and the like.

The internal entity 402 may be connected to the communications network 406 through a wireless or wired link 418, and/or through an intermediate network 420, which may be further connected to the communications network. The intermediate network 420 may be, for example, a complete network or a subnet of a local area network, a company wide intranet, and/or the Internet. The internal entity 402 may be identified on one or both of the networks 406, 420 by an address or a combination of addresses, such as a MAC address associated with the network interface 414 and an IP address. Because the internal entity 202 may be connected to the intermediate network 420, certain components may, at times, be shared with other internal entities. Therefore, a wide range of flexibility is anticipated in the configuration of the internal entity 402. Furthermore, it is understood that, in some implementations, a server 422 may be provided to support multiple internal entities 402. In other implementations, a combination of one or more servers and computers may together represent a single entity.

In the present example, the internal entities 402 represents those entities that are directly responsible for producing the end product, such as a wafer or individually tested IC devices. Examples of internal entities 402 include an engineer, customer service personnel, an automated system process, a design or fabrication facility and fab-related facilities such as raw-materials, shipping, assembly or test. Examples of external entities 404 include a customer, a design provider, and other facilities that are not directly associated or under the control of the fab. In addition, additional fabs and/or virtual fabs can be included with the internal or external entities. Each entity may interact with other entities and may provide services to and/or receive services from the other entities.

It is understood that the entities 402, 404 may be concentrated at a single location or may be distributed, and that some entities may be incorporated into other entities. In addition, each entity 402, 404 may be associated with system identification information that allows access to information within the system to be controlled based upon authority levels associated with each entities identification information.

The virtual fab 400 enables interaction among the entities 402, 404 for purposes related to IC manufacturing, as well as the provision of services. In the present example, IC manufacturing can include one or more of the following steps:

receiving or modifying a customer's IC order of price, delivery, and/or quantity;
  receiving or modifying an IC design;
  receiving or modifying a process flow;
  receiving or modifying a circuit design;
  receiving or modifying a mask change;
  receiving or modifying testing parameters;
  receiving or modifying assembly parameters; and
  receiving or modifying shipping of the ICs.

One or more of the services provided by the virtual fab 400 may enable collaboration and information access in such areas as design, engineering, and logistics. For example, in the design area, the customer 404 may be given access to information and tools related to the design of their product via the fab 402. The tools may enable the customer 404 to perform yield enhancement analyses, view layout information, and obtain similar information. In the engineering area, the engineer 402 may collaborate with other engineers 402 using fabrication information regarding pilot yield runs, risk analysis, quality, and reliability. The logistics area may provide the customer 404 with fabrication status, testing results, order handling, and shipping dates. It is understood that these areas are exemplary, and that more or less information may be made available via the virtual fab 400 as desired.

Another service provided by the virtual fab 400 may integrate systems between facilities, such as between a facility 404 and the fab facility 402. Such integration enables facilities to coordinate their activities. For example, integrating the design facility 404 and the fab facility 402 may enable design information to be incorporated more efficiently into the fabrication process, and may enable data from the fabrication process to be returned to the design facility 404 for evaluation and incorporation into later versions of an IC.

The present disclosure has been described relative to a preferred embodiment. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the disclosure will be employed without a corresponding use of other features. Accordingly, it is appropriate that the appended claims be construed broadly and in a manner consistent with the scope of the disclosure.

What is claimed is:

1. A computer-executable method for automating control of process equipment within a semiconductor fabrication facility, the method comprising:
  processing a current batch using the process equipment;
  removing the current batch from the process equipment;
  loading a next batch into the process equipment;
  testing the current batch to determine if the current batch was properly processed;
  removing the next batch from the process equipment if the current batch fails the testing; and
  correcting the process equipment before reloading the next batch.

2. The computer-executable method of claim 1 further comprising, if the current batch passes the testing, setting the next batch as a new current batch and processing the new current batch using the processing equipment.

3. The computer-executable method of claim 1 further comprising, after correcting the process equipment, setting the next batch as a new current batch and processing the new current batch using the processing equipment.

4. The computer-executable method of claim 1 wherein testing the current batch includes performing at least first and second tests using first and second pieces of monitor equipment.

5. The method of claim 4 wherein determining if the current batch was properly processed includes determining whether the current batch passed both the first and second tests.

6. The method of claim 1 wherein the process equipment is corrected using an automated process.

7. The method of claim 1 wherein correcting the process equipment includes performing maintenance on the process equipment.

8. A computer-executable method for automating furnace control in a semiconductor fabrication facility, the method comprising:

testing a current batch of devices with respect to at least one predefined criterion, wherein the current batch of devices was processed in a furnace;

sending test information resulting from the testing to a monitor system;

determining in the monitor system if a process applied to the current batch of devices was successful based on the test information;

sending at least one test result from the monitor system to an equipment controller associated with the furnace; and if the test result indicates that the current batch of devices satisfy the predefined criterion, using the equipment controller to begin processing a next batch of devices in the furnace.

9. The computer-executable method of claim 8 further comprising loading the next batch of devices into the furnace prior to determining whether the process applied to the current batch of devices was successful.

10. The computer-executable method of claim 9 further comprising, if the test result indicates that the current batch of devices does not satisfy the predefined criterion, unloading the next batch of devices from the furnace.

11. The computer-executable method of claim 10 further comprising sending a notification to a predefined destination to indicate that the furnace has a process problem.

12. The computer-executable method of claim 11 wherein the predefined destination is an engineer.

13. The computer-executable method of claim 8 further comprising storing the test information in a memory.

14. A system for automating semiconductor process equipment configured to perform at least one semiconductor fabrication step, the system comprising:

at least a first testing apparatus;

an equipment controller in communication with the process equipment and the first testing apparatus;

a monitor system in communication with the equipment controller; and a plurality of computer-executable instructions, including:

instructions for testing a current batch with respect to at least one predefined criterion using the first testing apparatus, wherein the current batch was processed using the process equipment;

instructions for sending test information resulting from the testing to the monitor system;

instructions for determining if the process equipment is operating correctly based on the test information;

instructions for sending at least one test result from the monitor system to the equipment controller; and instructions for processing a next batch using the processing equipment, if the test result indicates that the current batch satisfies the predefined criterion.

15. The system of claim 14 further comprising:

a second testing apparatus;

instructions for testing the current batch with respect to at least the one predefined criterion using the second testing apparatus; and instructions for determining whether the process equipment is operating correctly based on the test information resulting from both the first and second testing apparatuses.

16. The system of claim 14 further comprising an advanced material handling system positioned between the equipment controller and the monitor system.

17. The system of claim 14 further comprising a manufacturing execution system (MES) in communication with the equipment controller.

18. The system of claim 17 wherein the monitor system is integrated with the MES.

19. The system of claim 14 further comprising instructions for loading the next batch into the process equipment prior to determining whether the process applied to the current batch was successful.

20. The system of claim 14 further comprising instructions for, if the test result indicates that the current batch does not satisfy the predefined criterion, unloading the next batch from the process equipment.

* * * * *